(12) United States Patent
Shivell

(10) Patent No.: US 12,127,320 B2
(45) Date of Patent: Oct. 22, 2024

(54) RETROFIT REMOTE CONTROL DEVICE

(71) Applicant: Lutron Technology Company LLC, Coopersburg, PA (US)

(72) Inventor: William Taylor Shivell, Breinigsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/372,225

(22) Filed: Sep. 25, 2023

(65) Prior Publication Data

US 2024/0015873 A1    Jan. 11, 2024

Related U.S. Application Data

(63) Continuation of application No. 17/868,357, filed on Jul. 19, 2022, now Pat. No. 11,805,590, which is a continuation of application No. 17/064,648, filed on Oct. 7, 2020, now Pat. No. 11,412,604, which is a continuation of application No. 16/522,772, filed on Jul. 26, 2019, now Pat. No. 10,849,209.

(60) Provisional application No. 62/711,073, filed on Jul. 27, 2018.

(51) Int. Cl.
| | |
|---|---|
| *H05B 47/19* | (2020.01) |
| *G05G 1/10* | (2006.01) |
| *G08C 17/02* | (2006.01) |
| *H01H 3/02* | (2006.01) |
| *H02G 3/14* | (2006.01) |

(52) U.S. Cl.
CPC ............. *H05B 47/19* (2020.01); *G05G 1/105* (2013.01); *G08C 17/02* (2013.01); *H01H 3/02* (2013.01); *H02G 3/14* (2013.01); *G08C 2201/12* (2013.01)

(58) Field of Classification Search
CPC ........ H05B 47/19; G05G 1/105; G08C 17/02; G08C 2201/12; H01H 3/02; H02G 3/14
See application file for complete search history.

(56) References Cited

U.S. PATENT DOCUMENTS

| | | | |
|---|---|---|---|
| 4,835,343 | A | 5/1989 | Graef et al. |
| 5,041,698 | A | 8/1991 | Takagi et al. |
| 9,208,965 | B2 | 12/2015 | Busby et al. |
| 9,559,505 | B2 | 1/2017 | Gage |
| 10,395,865 | B2 | 8/2019 | Scruggs |
| 10,410,802 | B2 | 9/2019 | Dimberg et al. |
| 10,475,596 | B2 | 11/2019 | Dimberg et al. |
| 10,586,667 | B2 | 3/2020 | Dimberg |

(Continued)

FOREIGN PATENT DOCUMENTS

WO    2017210532 A1    12/2017

*Primary Examiner* — Henry Luong
(74) *Attorney, Agent, or Firm* — Flaster Greenberg, PC

(57) ABSTRACT

Remote control devices may control electrical loads and/or load control devices of a load control system without accessing electrical wiring. The remote control device may be mounted over a mechanical switch that is installed in a wallbox. The remote control device may include a control unit and a faceplate assembly. The faceplate assembly may include a mounting frame, an adapter plate, and a faceplate. The mounting frame may be configured to abut a bezel of the mechanical switch such that that the faceplate is spaced away from the bezel of the mechanical switch to enable the mounting ring to extend through respective openings in the adapter plate and the faceplate.

20 Claims, 11 Drawing Sheets

(56) References Cited

U.S. PATENT DOCUMENTS

| | | |
|---|---|---|
| 2008/0111491 A1 | 5/2008 | Spira et al. |
| 2016/0013626 A1 | 1/2016 | Gage |
| 2017/0257096 A1* | 9/2017 | Lark, Jr. .............. H03K 17/962 |
| 2017/0278652 A1 | 9/2017 | Dimberg et al. |
| 2018/0190451 A1 | 7/2018 | Scruggs |

* cited by examiner

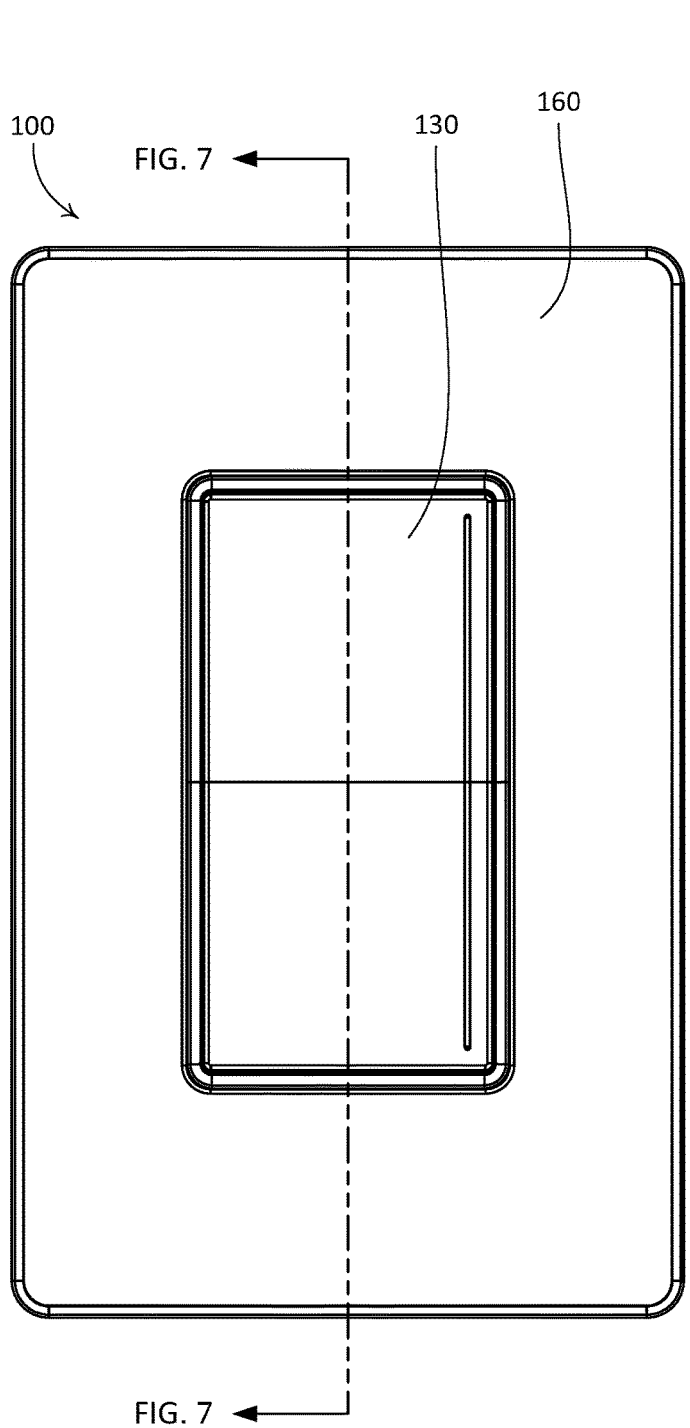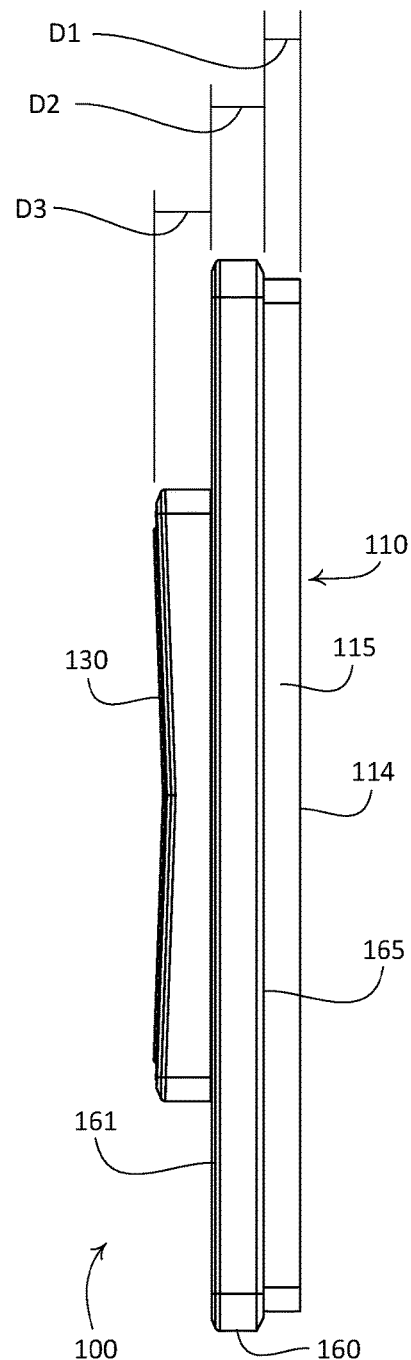
FIG. 2
FIG. 3

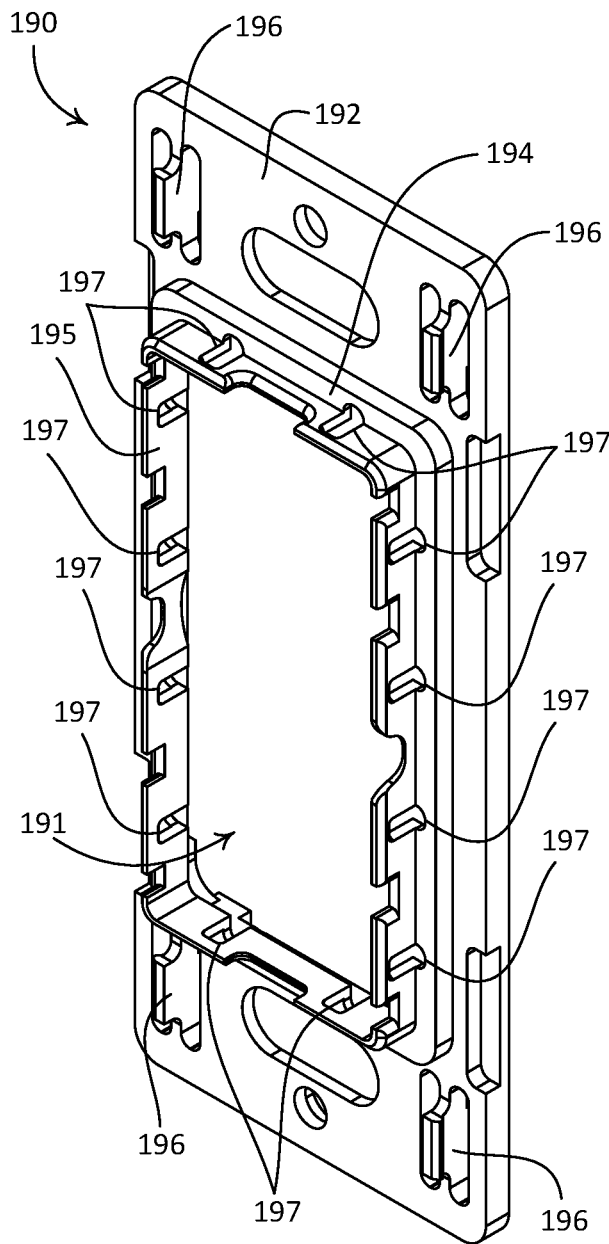
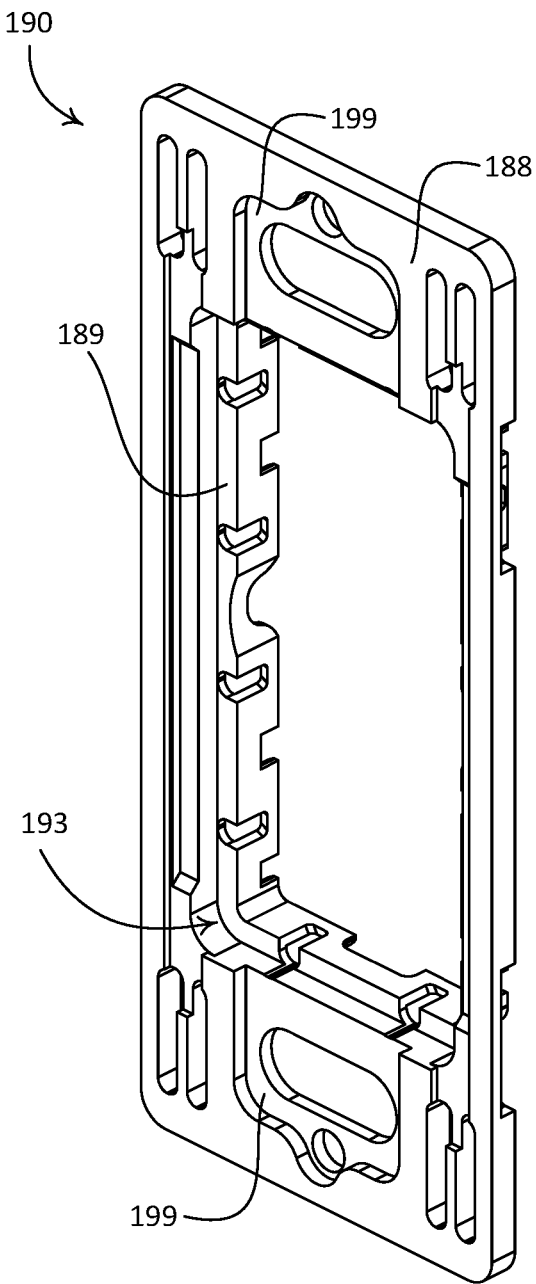
FIG. 8A
FIG. 8B

RETROFIT REMOTE CONTROL DEVICE

CROSS REFERENCE TO RELATED APPLICATIONS

This application is a continuation of U.S. patent application Ser. No. 17/868,357, filed Jul. 19, 2022, which is a continuation of U.S. patent application Ser. No. 17/064,648, filed Oct. 7, 2020, which is a continuation of U.S. patent application Ser. No. 16/522,772, filed Jul. 26, 2019, which claims priority to U.S. provisional patent application No. 62/711,073, filed Jul. 27, 2018, which are incorporated herein by reference in their entirety.

BACKGROUND

During the installation of typical load control systems, standard mechanical switches, such as traditional toggle switches or decorator paddle switches, may be replaced by more advanced load control devices, such as dimmer switches, that control the amount of power delivered from an alternating current (AC) power source to one or more electrical loads. Such an installation procedure typically requires that the existing mechanical switch be disconnected from the electrical wiring and removed from a wallbox in which it is mounted, and that the load control device then be connected to the electrical wiring and installed in the wallbox. An average consumer may not feel comfortable performing the electrical wiring required in such an installation. Accordingly, such a procedure may typically be performed by an electrical contractor or other skilled installer. However, hiring an electrical contractor may be cost prohibitive to the average consumer.

Controllable light sources, such as controllable screw-in light-emitting diode (LED) lamps, may provide an easier solution for providing advanced control of lighting. For example, an older incandescent lamp simply be unscrewed from a socket and the controllable light source may be screwed into the socket. The controllable light sources may be controlled by remote control devices. However, the sockets in which the controllable light sources are installed may be controlled by an existing wall-mounted light switch. When the wall-mounted light switch is operated to an off position, power to the controllable light source may be cut, such that the controllable light source may no longer respond to commands transmitted by the remote control devices. Accordingly, it is desirable to prevent operation of such a wall-mounted light switch to ensure that the delivery of power to the controllable light source continues uninterrupted.

SUMMARY

As described herein, example remote control device may provide a simple retrofit solution for existing switched control systems. Implementation of the remote control device, for example in existing switched control systems, may enable energy savings and/or advanced control features, for example without requiring any electrical re-wiring and/or without requiring the replacement of any existing mechanical switches.

The remote control device may be configured to control one or more electrical loads, such as lighting loads, and/or load control devices. The remote control device may be configured to be mounted over the respective actuators of existing mechanical switches that, for example, may control whether power is delivered to the one or more electrical loads. The remote control device may be configured to control one or more load control devices of a load control system without requiring access to the electrical wiring of the load control system. One or more electrical loads may be electrically connected to a load control device such that the load control device may control an amount of power delivered to the one or more electrical loads. The control unit of the remote control device may be configured to transmit one or more commands for controlling the electrical loads via wireless communication.

The remote control device may be configured to maintain the actuators of mechanical switches over which they are installed in respective on positions, such that users of the remote control device are not able to mistakenly switch the actuators to the off position, which may cause one or more electrical load to be unpowered such that the one or more electrical loads cannot be controlled by one or more remote control device. The remote control device may be configured to control multiple types of electrical loads on a single electrical circuit, for instance substantially in unison. A load control system may include multiple remote control devices that are configured to provide individual, such as zoned control of each of a plurality of electrical loads coupled to a single electrical circuit.

The remote control device may include a faceplate assembly and a control unit. The faceplate assembly may include a faceplate, an adapter plate, and a mounting frame. The adapter plate may be configured to be attached to a yoke of an installed mechanical switch. The mounting frame may be configured to space the faceplate away from a bezel of an installed mechanical switch. The control unit may be configured to be removably attached to the mounting frame. The faceplate may be configured to be removably attached to the adapter plate. One or more of the adapter plate, the mounting frame, the control unit, and the faceplate of the remote control device may be configured so as to be staggered relative to a surface of a structure to which the one or more mechanical switches are installed, such as a wallboard surface that surrounds a wallbox in which the one or more mechanical switches are installed.

In an example installation process, the remote control device may be installed by: (1) removing a switch plate from a mechanical switch that is installed in a single-gang wallbox; (2) attaching an adapter plate and a mounting frame of the remote control device to a yoke of the mechanical switch; (3) attaching a faceplate of the remote control device to the adapter plate, and (4) attaching a control unit of the remote control device to the mounting frame, wherein the faceplate defines an opening through which a portion of the mounting frame is received as the faceplate is attached to the adapter plate.

BRIEF DESCRIPTION OF THE DRAWINGS

FIG. 2 is a front view of the example remote control device illustrated in FIG. 1.

FIG. 3 is a side view of the example remote control device illustrated in FIG. 1.

FIG. 8A is a front perspective view of an example mounting frame of the example remote control device illustrated in FIG. 1.

FIG. 8B is a rear perspective view of the example mounting frame illustrated in FIG. 8A.

DETAILED DESCRIPTION

Figure 4:
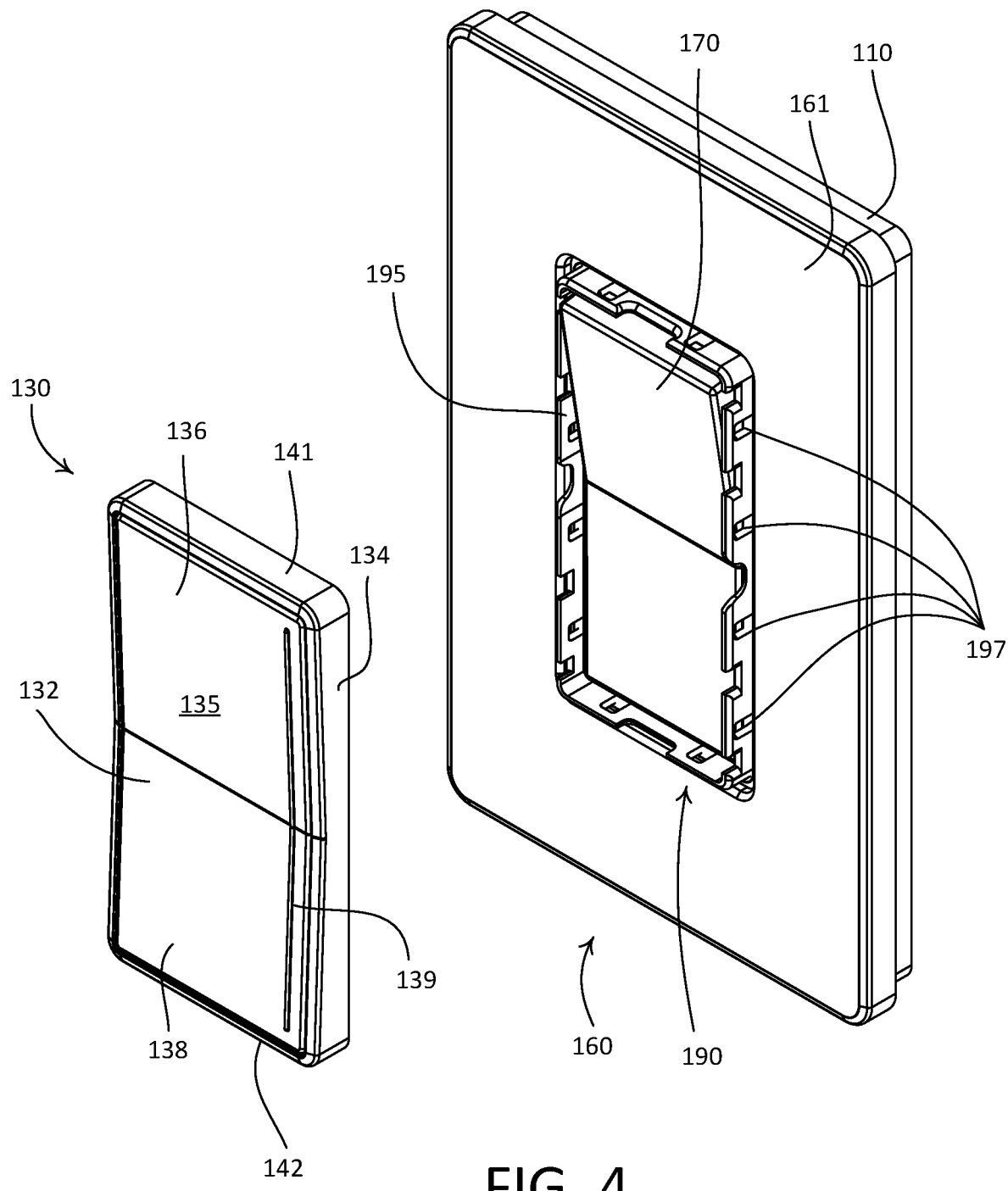
FIG. 4 is a partially exploded front perspective view of the example remote control device illustrated in FIG. 1.
Figure 5:
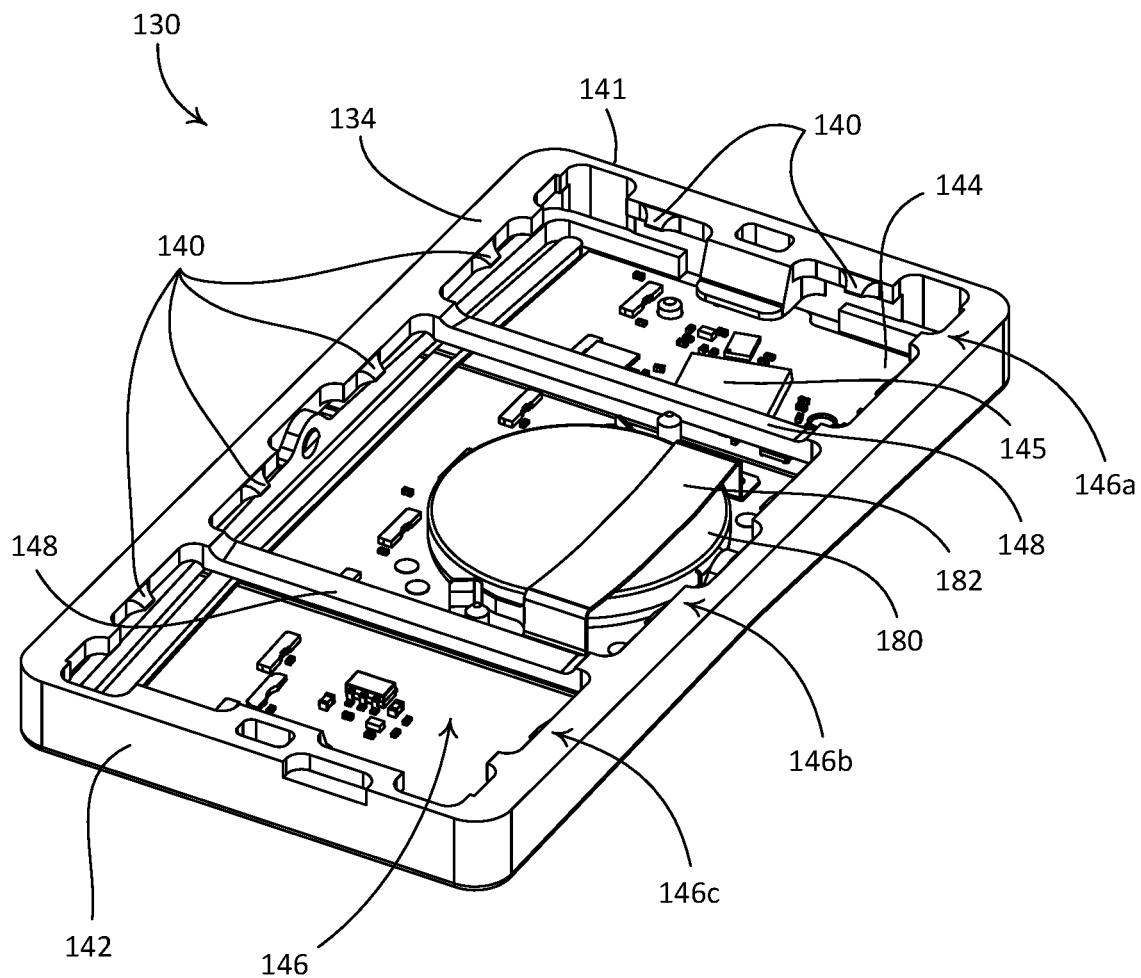
FIG. 5 is a rear perspective view of an example control unit of the example remote control device illustrated in FIG. 1.
Figure 6:
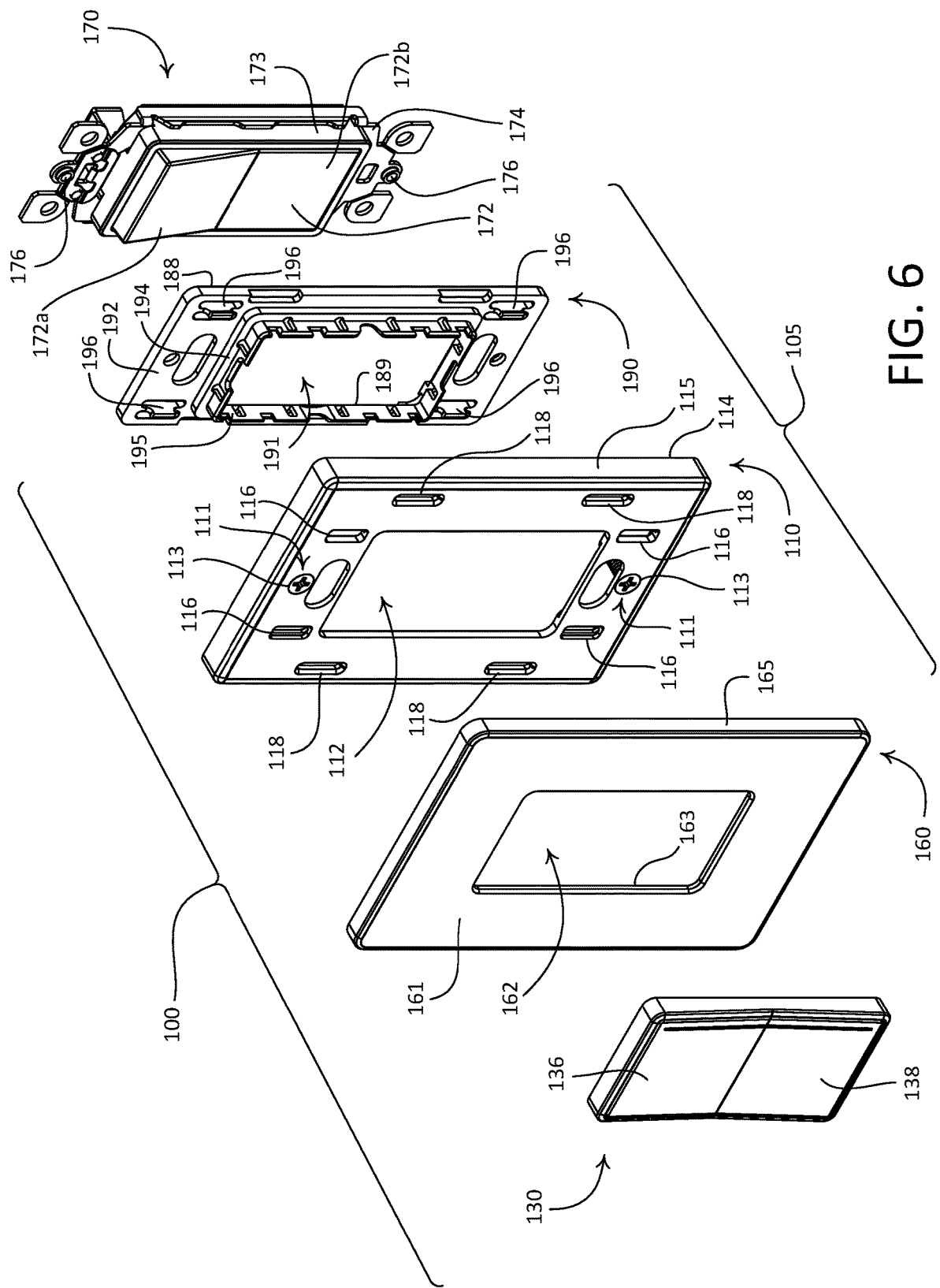
FIG. 6 is an exploded view of the example remote control device illustrated in FIG. 1.

FIGS. 1-7 depict an example of a remote control device 100 that may be installed in a load control system, such as a lighting control system. The load control system may include a mechanical switch 170 that may be in place prior to installation of the remote control device 100, for example pre-existing in the load control system. As shown, the mechanical switch 170 may be a standard decorator paddle switch. The load control system may further include one or more electrical loads, such as lighting loads. The mechanical switch 170 may be coupled in series electrical connection between an alternating current (AC) power source and the one or more electrical loads. The mechanical switch 170 may include an actuator 172 that may be surrounded by a bezel 173 and may be actuated to turn on and/or turn off, the one or more electrical loads. An upper portion 172a of the actuator 172 may protrude from the bezel 173 (e.g., in a first orientation, as shown in FIG. 6) when the electrical load is off, and a lower portion 172b of the actuator 172 may protrude from the bezel 173 (e.g., in a second orientation) when the electrical load is on, or vice versa. The mechanical switch 170 may include a yoke 174 that enables mounting of the mechanical switch 170 to a structure. For example, the yoke 174 may be fastened to a single-gang wallbox that is installed in an opening of a structure (e.g., such as a wall, ceiling, etc.). The remote control device 100 may be configured to be installed on the mechanical switch 170 in a single-gang wallbox.

The load control system may further include a load control device (not shown) that is electrically connected to the one or more electrical loads (e.g., lighting loads). The load control device may include a load control circuit for controlling the intensity of one or more of the lighting loads between a low-end intensity (e.g., approximately 1%) and a high-end intensity (e.g., approximately 100%), and may include a wireless communication circuit. In an example implementation, the load control device may be a standalone dimmer switch that is electrically connected to the one or more lighting loads. In another example implementation, each of the one or more electrical loads may be a controllable light source (e.g., a screw-in light-emitting diode (LED) lamp) that each may include a respective integrated load control circuit and wireless communication circuit (e.g., the lighting load includes a corresponding load control device that is configured for wireless communication). It should be appreciated that the load control system is not limited to the example load control devices described herein.

The remote control device 100 may include a control unit 130 (e.g., a control module) and a faceplate assembly 105. The control unit 130 may include a user interface comprising an actuation portion 132 that may be attached to a base portion 134. The actuation portion 132 may comprise a front surface 135 having an upper portion 136 and a lower portion 138. The actuation portion 132 may be configured to pivot about a central axis in response to an actuation of the upper portion 136 and the lower portion 138. The control unit 130 may be configured to control an electrical load to turn the electrical load on in response to an actuation of the upper portion 136 and to turn the electrical load off in response to an actuation of the lower portion 138. The front surface 135 of the actuation portion 132 may also be configured as a touch sensitive surface (e.g., a capacitive touch surface) that is configured to receive (e.g., detect) inputs, such as gestures, from a user of the control unit 130. The control unit 130 may also include a light bar 139 configured to be illuminated by one or more light sources (e.g., one or more LEDs). For example, the light bar 139 may be illuminated to visibly display information to a user of the control unit 130. The front surface 135 of the actuation portion 132 may be actuated along the light bar 139 to adjust the amount of power delivered to the lighting load according to the position of the actuation.

The faceplate assembly 105 may include an adapter plate 110, a mounting frame 190, and a faceplate 160. Prior to installation of the remote control device 100, a pre-existing faceplate (not shown) may be removed from the mechanical switch 170, for instance by removing faceplate screws (not shown) from corresponding faceplate screw holes 176 in the yoke 174. The adapter plate 110 may be made of any suitable material, such as plastic. The adapter plate 110 may be configured to be attached to the yoke 174 of the mechanical switch 170. For example, the adapter plate 110 may be secured to the yoke 174 using fasteners, such as screws 111 that are received through openings 113 in the adapter plate 110 and installed into the faceplate screw holes 176 in the yoke 174. As shown, the adapter plate 110 may define an opening 112 that extends therethrough. The opening 112 may be configured to receive a portion of the mechanical switch 170 that may include, for example, the actuator 172 and/or the bezel 173 that surrounds a perimeter of the actuator 172. The adapter plate 110 may define a rear edge 114 that is configured to abut a surface of a structure to which the mechanical switch 170 is installed, such as a wallboard surface that surrounds a wallbox in which the mechanical switch 170 is installed. The adapter plate 110 may be configured such that the faceplate 160 is spaced from the structure and appears to be floating off the structure.

The faceplate 160 may define a front surface 161 and an opposed rear surface 163. The front surface 161 may alternatively be referred to as an outer surface of the faceplate 160, and the rear surface 163 may alternatively be referred to as an inner surface of the faceplate 160. The faceplate 160 may define an opening 162 therethrough that is configured to receive a portion of the control unit 130, such that the control unit 130 protrudes proud of the faceplate 160 when the remote control device 100 is in an assembled configuration. The faceplate 160 may define one or more snaps (e.g., resilient snap fit connectors) that extend from the rear surface 163 and are configured to engage with the one or more holes 118 of the adapter plate 110, to releasably attach the faceplate 160 to the adapter plate 110. The faceplate 160 may be made of any suitable material, such as plastic. The faceplate 160 may include an indicia (not shown). The indicia may indicate a proper orientation of the faceplate 160. The rear surface 163 of the faceplate may include mounting instructions for the faceplate 160 and/or the remote control 100.

The mounting frame 190 may define a plate 192, an opening 191, and a mounting ring 195. The mounting ring 195 may extend from the plate 192, for example, such that the mounting ring 195 surrounds the opening 191. The plate 192 may further define a lip 194 that extends therefrom. The mounting ring 195 may extend from the lip 194. The lip 194 may surround the opening 191. The lip 194 may define a perimeter that extends beyond the mounting ring 195. For example, the lip 194 may define a first portion 194A and a second portion 194B. The first portion 194A may extend a first direction that is substantially perpendicular to the plate 192. The second portion 194B may extend a second direction that is substantially parallel to the plate 192 and toward a center of the opening 191. The lip 194 may be configured such that the faceplate 160 is spaced away from the bezel 173 of the mechanical switch 170. For example, the lip 194 may be configured to abut the rear surface 163 of the faceplate 160. For example, a front surface of the bezel 173 may abut the mounting frame 190 when the remote control device 100 is installed on the mechanical switch 170. A rear surface 189 of the plate 192 may be configured to abut the yoke 174 of the mechanical switch 170.

The mounting frame 190 may be configured to enable removable attachment of the control unit 130 to the mounting frame 190. For example, the mounting frame 190 may define one or more attachment members that are configured to engage with complementary features of the control unit 130. As shown, the mounting ring 195 may define one or more apertures 197 that are configured to engage with complementary features of the control unit 130. For example, each of the one or more apertures 197 may be configured to receive a respective snap 140 (e.g., snap fit connector) of the control unit 130. The mounting ring 195 may extend through the opening 112 in the adapter plate 110 and through the opening 162 in the faceplate 160. The mounting ring 195 may extend from the bezel 173 of the mechanical switch 170 through the opening 162 in the faceplate 160 such that the control unit 130 can be secured to the mounting frame 190. For example, the control unit 130 may mount to the mounting frame 190 proximate to the front surface 161 of the faceplate 160.

The mounting frame 190 may be configured to enable removable attachment of the adapter plate 110 to the mounting frame 190. For example, the mounting frame 190 may define one or more tabs 196 that are configured to engage with complementary features of the adapter plate 110. The opening 112 of the adapter plate 110 may be larger than the opening 162 of the faceplate 160. For example, the opening 112 may have a larger perimeter than the opening 162. The opening 112 of the adapter plate 110 may be sized to receive the bezel 173 of the mechanical switch 170, while the opening 162 may be sized to receive the actuator 172 of the mechanical switch 170. The opening 112 may be configured such that the lip 194 and the mounting ring 195 extend beyond the adapter plate 110 (e.g., via the opening 112) when the remote control device 100 is installed on the mechanical switch 170. The adapter plate 110 being removably attached to the adapter plate 110 may enable the remote control device 100 to be installed in the field in the locations (e.g., only in the locations) where remote control of an electrical load is desired.

The adapter plate 110 may be configured to enable removable attachment of the faceplate 160 to the adapter plate 110. For example, the adapter plate 110 may define one or more attachment members that are configured to engage with complementary features of the faceplate 160. As previously mentioned, the one or more holes 118 of the adapter plate 110 may be configured to receive complementary features of the faceplate 160 (e.g., resilient snap fit connectors, such as the snaps that extend from the rear surface 163 of the faceplate 160). The one or more holes 118 may be configured as recessed ledges that are configured to engage the complementary features of the faceplate 160.

As shown in FIGS. 4 and 5, the control unit 130 may be rectangular in shape and elongate between a first end 141 and an opposed second end 142. It should be appreciated that the control unit 130 is not limited to the illustrated rectangular geometry, and that control unit may alternatively be configured with other suitable geometries. In accordance with the illustrated orientation of the control unit 130, the first end 141 may be referred to as an upper end of the control unit 130 and the second end 142 may be referred to as a lower end of the control unit 130. The first and second ends 141, 142 of the control unit 130 may also be referred to as first and second ends of the base portion 134, respectively. The control unit 130 may comprise a printed circuit board 144 (e.g., a flexible or rigid printed circuit board). The base portion 134 may define a void 146 that is configured to receive the printed circuit board 144 in an attached position. The base portion 134 may be made of any suitable material, such as plastic.

The front surface 135 of the actuation portion 132 of the control unit 130 may define a capacitive touch user interface that is configured to receive inputs, such as gestures, from a user of the remote control device 100. For example, the printed circuit board 144 may include one or more capacitive touch regions, or surfaces. The printed circuit board 144 may include a linear capacitive touch surface that faces an inner surface of the actuation portion 132 when the printed circuit board 144 is disposed in the void 146. The front surface 135 of the actuation portion 132 may be configured to detect touches along an x-axis, a y-axis, or both an x-axis and a y-axis.

The control unit 130 may further include a control circuit (e.g., a processor, not shown) and a wireless communication circuit (e.g., an RF transceiver, not shown). The control circuit and the wireless communication circuit may be mounted to the printed circuit board 144. For example, the control unit 130 may comprise an integrated circuit 145, that may be mounted to the printed circuit board 144 (e.g., as shown in FIG. 5) and may include an integral processor and an integral RF transceiver. The control circuit may be in electrical communication with the capacitive touch regions of the printed circuit board 144, and the wireless communication circuit may be in electrical communication with the control circuit. The printed circuit board 144 may be configured such that the capacitive touch regions are spaced from the control circuit, the wireless communication circuit, and/or other "noisy" circuitry of the printed circuit board 144, which may improve operational efficiency of the capacitive touch regions. The control unit 130 may be configured to translate one or more inputs applied via the front surface 135 of the actuation portion 132 into respective control signals that may be used to control a load control device of a load control system. For example, the control circuit may be configured to receive signals from the capacitive touch surface that correspond to inputs, such as gestures, applied to the front surface 135 of the actuation portion 132 by a user of the remote control device 100. The control circuit may be configured to interpret the signals into commands that the user desires the control unit 130 to cause to be executed.

The light bar 139 of the control unit 130 may be configured to provide a visual indication of a command issued by the remote control device 100. For example, the control circuit may be configured to, upon receiving a gesture indicative of a command to change an amount of power delivered to an electrical load, such as a command to dim a lighting load, indicate the amount of power delivered to the electrical load by temporarily illuminating a number of the plurality of LEDs that corresponds with the desired amount of power (e.g., the desired dimming level of the lighting load). In such an example, the control circuit may be configured to cause the LEDs to be illuminated simultaneously, to illuminate sequentially with some or little overlap before fading, or to otherwise illuminate as desired.

The illustrated control unit 130 may be battery-powered. For example, as shown, the control unit 130 may include an electrical contact 182 that is mounted to the printed circuit board 144 and configured to retain a battery 180, for instance the illustrated coin cell battery. The battery 180 may be placed in electrical communication with the circuitry mounted to the printed circuit board 144, for instance to power the capacitive touch regions, the control circuit, the wireless communication circuit, and/or other circuitry of the control unit 130. Alternatively, the control unit 130 may be configured to derive power from a power source connected to the mechanical switch 170, such as source of AC power for example. In addition, the control unit 130 may be powered from a power source located in the faceplate assembly 105. For example, the adapter plate 110 may be configured to store one or more batteries, for example, in a void defined between an inner surface of the faceplate 160 and the adapter plate 110, and the batteries may be electrically connected to the control unit 130 for powering the circuitry of the control unit.

Figure 1:
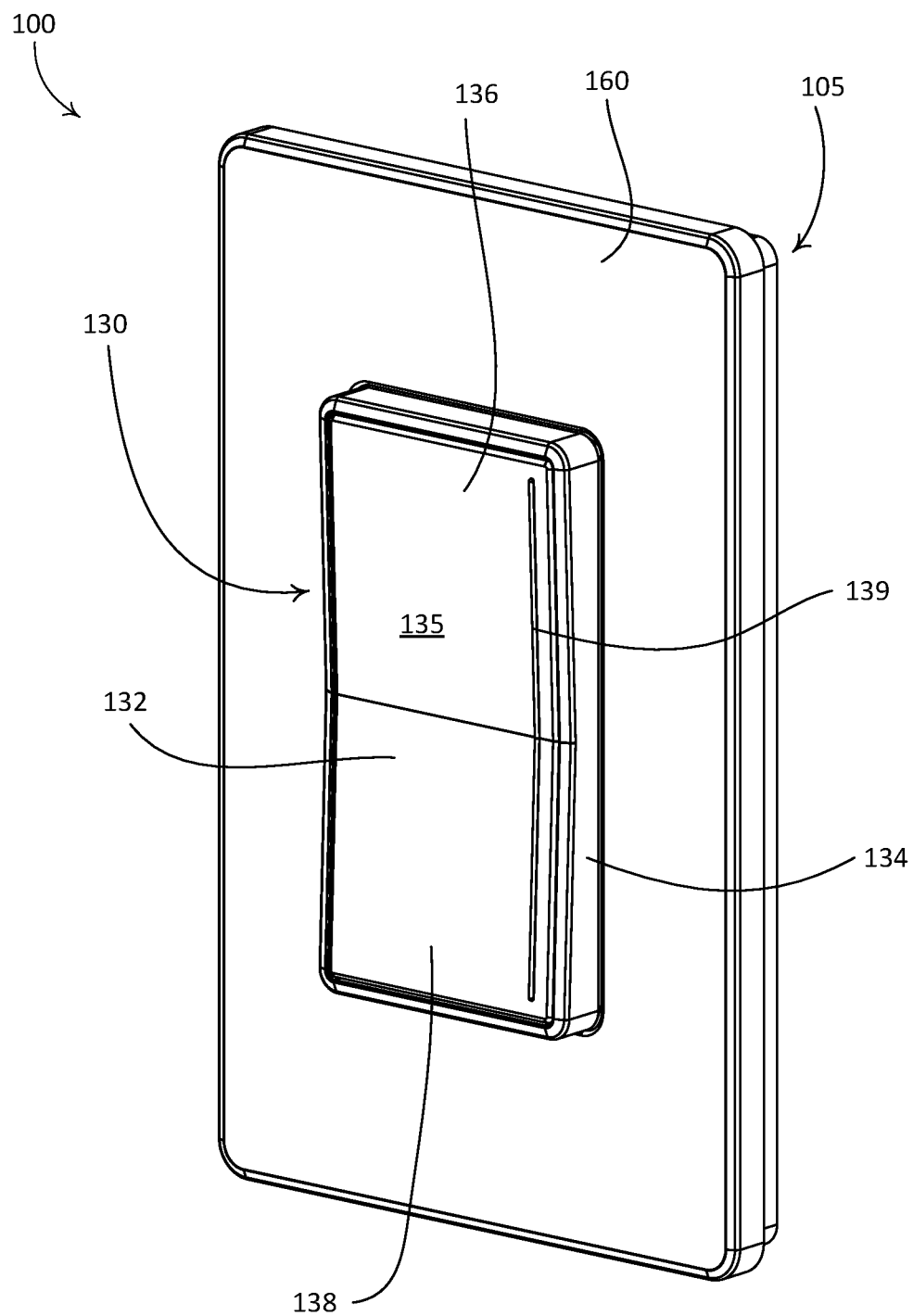
FIG. 1 is a perspective view of an example remote control device.

The control unit 130 may be configured to be attached to the mounting frame 190 with the light bar 139 located on a predetermined side of the control unit (e.g., the right side of the control unit as shown in FIG. 1), for example, such that the light bar 139 may be illuminated to indicate the amount of power presently being delivered to the electrical load. The control unit 130 may be configured to be attached to the mounting frame 190 with the light bar 139 located on a predetermined side of the control unit independent of a position of the actuator 172 of the mechanical switch 170 (e.g., whether the upper portion 172a or the lower portion 172b of the actuator 172 is protruding from the bezel 173). For example, the control unit 130 may be configured to receive a battery 180 in a central portion (e.g., the center) of the base portion 134. When the battery 180 is located in the central portion of the base portion 134, the control unit 130 may be installed on the mechanical switch 170 with the actuator 172 of the mechanical switch 170 in either orientation. In addition, the control unit 130 may be configured to be attached to the mounting frame 190 with the light bar 139 located on the left side of the control unit.

The void 146 of the control unit 130 may be configured to receive a portion of the actuator 172 of the mechanical switch 170 when the control unit 130 is attached to the mounting frame 190. The control unit 130 may define separate portions of the void 146, for example, as shown in FIG. 5. For example, the separate portions of the void 146 may be separated by support arms 148. For example, the support arms 148 may define a first portion 146a of the void 146, a second portion 146b of the void 146, and a third portion 146c of the void 146. The second portion 146b of the void 146 may be a central portion of the void 146 that is configured to retain the battery 180. The first portion 146a and the third portion 146c may be edge portions of the void 146 that are configured to receive the protruding portion of the actuator 172 of the mechanical switch 170. For example, the first portion 146a may receive the upper portion 172a of the actuator 172 when the mechanical switch 170 is in a first orientation (e.g., when the upper portion 172a of the actuator 172 is protruding from the bezel 173). The third portion 146c may receive the portion of the lower portion 172b of the actuator 172 when the mechanical switch 170 is in a second orientation (e.g., when the lower portion 172a of the actuator 172 is protruding from the bezel 173).

When the control unit 130 is attached to the mounting frame 190, the respective portion of the void 146 may be positioned over, and receive, the portion of the actuator 172 that protrudes from the mechanical switch 170. To illustrate, if the actuator 172 of the mechanical switch 170 is in a first orientation, such that the upper portion 172a of the actuator 172 protrudes from the bezel 173, the first portion 146a of the void 146 may be positioned to receive the upper portion 172a of the actuator 172. Alternatively, if the actuator 172 of the mechanical switch 170 is in a second orientation, such that the lower portion 172b of the actuator 172 protrudes from the bezel 173, the third portion 146c of the void 146 may be positioned to receive the lower portion 172b of the actuator 172. In this regard, the control unit 130 may be configured to be attached to the mounting frame 190 when the actuator 172 of the mechanical switch 170 is in at least first and second orientations. The control unit 130 and/or the mounting frame 190 may be keyed such that the control unit 130 can only be mounted in the first orientation or the second orientation.

The snaps 140 (e.g., snap fit connectors) may be configured to engage with corresponding the apertures 197 of the mounting ring 195, to releasably attach the control unit 130 to the mounting frame 190 (e.g., the mounting ring 195). The snaps 140 may be spaced along opposed sides of and protruding into the void 146. For example, each side (e.g., all four sides) of the void 146 may include one or more snaps 140. The snaps 140 may be configured to mount the control unit 130 to the mounting frame 190. The battery 180 in the control unit 130 may be removed and/or replaced without removing the faceplate 160. For example, the control unit 130 may be removed from the mounting frame 190 (e.g., the mounting ring 195) to enable replacement of the battery 180. The adapter plate 110 may be configured to store one or more spare batteries, for example, in a void defined between an inner surface of the faceplate 160 and the adapter plate 110, and the batteries may be used to replace depleted batteries in the control unit 130.

The control circuit may be configured to cause the wireless communication circuit to transmit respective commands that correspond to interpreted gestures received at the capacitive touch surface. For example, the remote control device 100 may be operable to transmit wireless signals, for example radio frequency (RF) signals, to a load control device, one or more electrical loads, and/or a central processor of a load control system. The remote control device 100 may be associated with the load control device and the one or more electrical loads during a configuration procedure of the load control system. An example of a configuration procedure for associating a remote control device with a load control device is described in greater detail in commonly-assigned U.S. Patent Publication No. 2008/

0111491, published May 15, 2008, entitled RADIO-FREQUENCY LIGHTING CONTROL SYSTEM, the entire disclosure of which is hereby incorporated by reference.

The adapter plate 110, the control unit 130, and/or the faceplate 160 may be configured so as to be staggered relative to a surface of a structure to which the mechanical switch 170 is installed, such as a wallboard surface that surrounds a wallbox in which the mechanical switch 170 is installed. For example, when the mounting frame 190 is attached to the yoke 174 of the mechanical switch 170, the control unit 130 is attached to the mounting frame 190, and the faceplate 160 is attached to the adapter plate 110, a rear edge 165 of the faceplate 160 may be spaced from the rear edge 114 of the adapter plate 110 that abuts a structural surface (e.g., wallboard surface) through a first distance D1 such that the faceplate 160 is spaced from the structural surface (e.g., as shown in FIG. 3). Additionally, the front surface 161 of the faceplate 160 may be spaced from the rear edge 165 of the faceplate 160 by a second distance D2, and an outer surface of the control unit 130 is spaced from the front surface 161 of the faceplate 160 by a third distance D3. The first distance D1, the second distance D2, and the third distance D3 may be substantially equal to each other. However it should be appreciated that one or more of the adapter plate 110, the control unit 130, and/or the faceplate 160 may be otherwise configured such that one or more of the first, second, and third distances D1, D2, D3 are different from each other.

Although the adapter plate 110 and the mounting frame 190 are shown as separate components, it should be appreciated that the adapter plate 110 and the mounting frame 190 may be combined into a single component. For example, the adapter plate 110 and the mounting frame 190 may be molded together. In addition, the faceplate 160, the adapter plate 110, and the mounting frame 190 may be molded together, for example, as a single component.

Figure 8D:
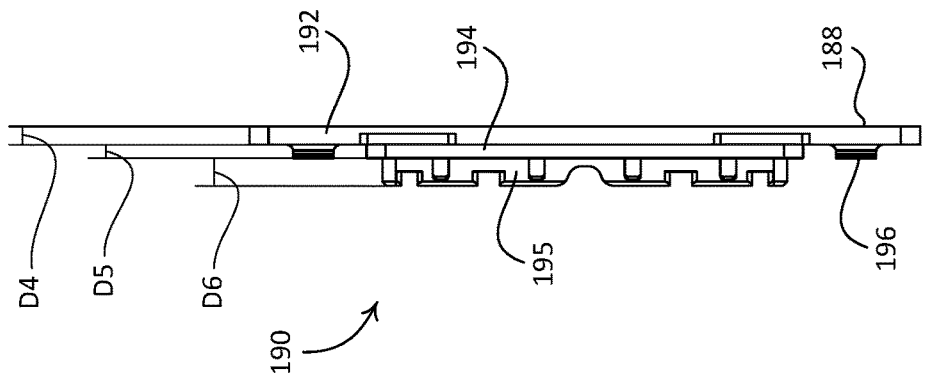
FIG. 8D is a side view of the example mounting frame illustrated in FIG. 8A.
Figure 8E:
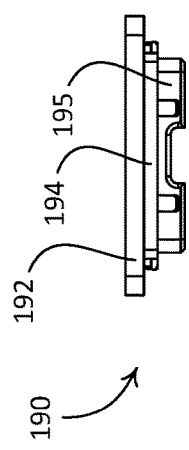
FIG. 8E is a top view of the example mounting frame illustrated in FIG. 8A.
Figure 8C:
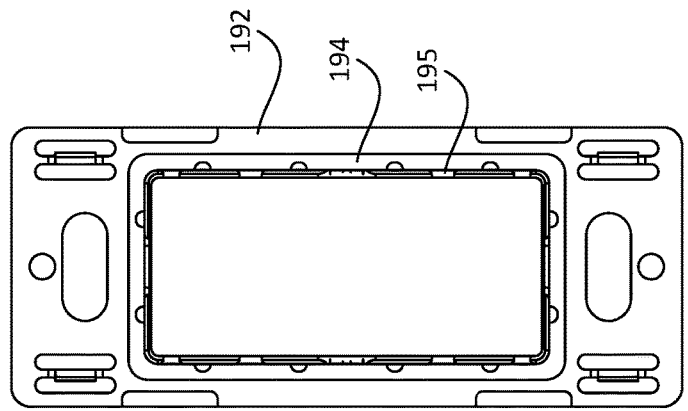
FIG. 8C is a front view of the example mounting frame illustrated in FIG. 8A.

FIGS. 8A-8E depict various views of the example mounting frame 190. The mounting frame 190 may define a recess 193 that is proximate to the opening 191. For example, the recess 193 may surround the opening 191, as shown in FIG. 8B. The recess 193 may extend from the rear surface 188 of the plate 192 of the mounting frame 190 to a rear surface 189 of the mounting ring 195. The recess may be defined as a fourth opening between the plate 192 and the mounting ring 195. The recess 193 may be configured to receive a portion (e.g., the bezel 173) of the mechanical switch 170 when the remote control device 100 is installed on the mechanical switch 170. For example, a front surface of the bezel 173 may abut the rear surface 189 of the mounting ring 195 when the remote control device 100 is installed on the mechanical switch 170. The mounting frame 190 may define one or more cavities 199. The one or more cavities 199 may be defined from the rear surface 188 of the plate 192 the mounting frame 190. The one or more cavities 199 may be configured to receive the yoke 174 of the mechanical switch 170.

The mounting ring 195 may include the apertures 197 that extend therethrough. For example, each side of the mounting ring 195 may include one or more apertures 197, as shown. In an example, the mounting ring 195 may include two apertures 197 at the top and bottom sides and four apertures 197 at the left and right sides. The one or more apertures 197 may be oblong and may start at the lip 194. The one or more apertures 197 may extend (e.g., partially extend) into the lip 194.

The plate 192 may be defined by a thickness D4. The lip 194 may extend a distance D5 from the plate 192. The mounting ring 195 may extend a distance D6 from the lip 194. The distance D5 may be configured such that the faceplate 160 is spaced away from the bezel 173 of the mechanical switch 170 such that the mounting ring 195 extends through the opening 162 of the faceplate 160. The distance D5 may be as thin as practicable, for example, approximately 0.030 inches. The distance D6 may be configured such that the control unit 130 is securably retained by the mounting ring 195. For example, the distance D6 may be configured such that each of the snaps 140 of the control unit 130 can be received by respective apertures 197 in the mounting ring 195.

Figure 9:
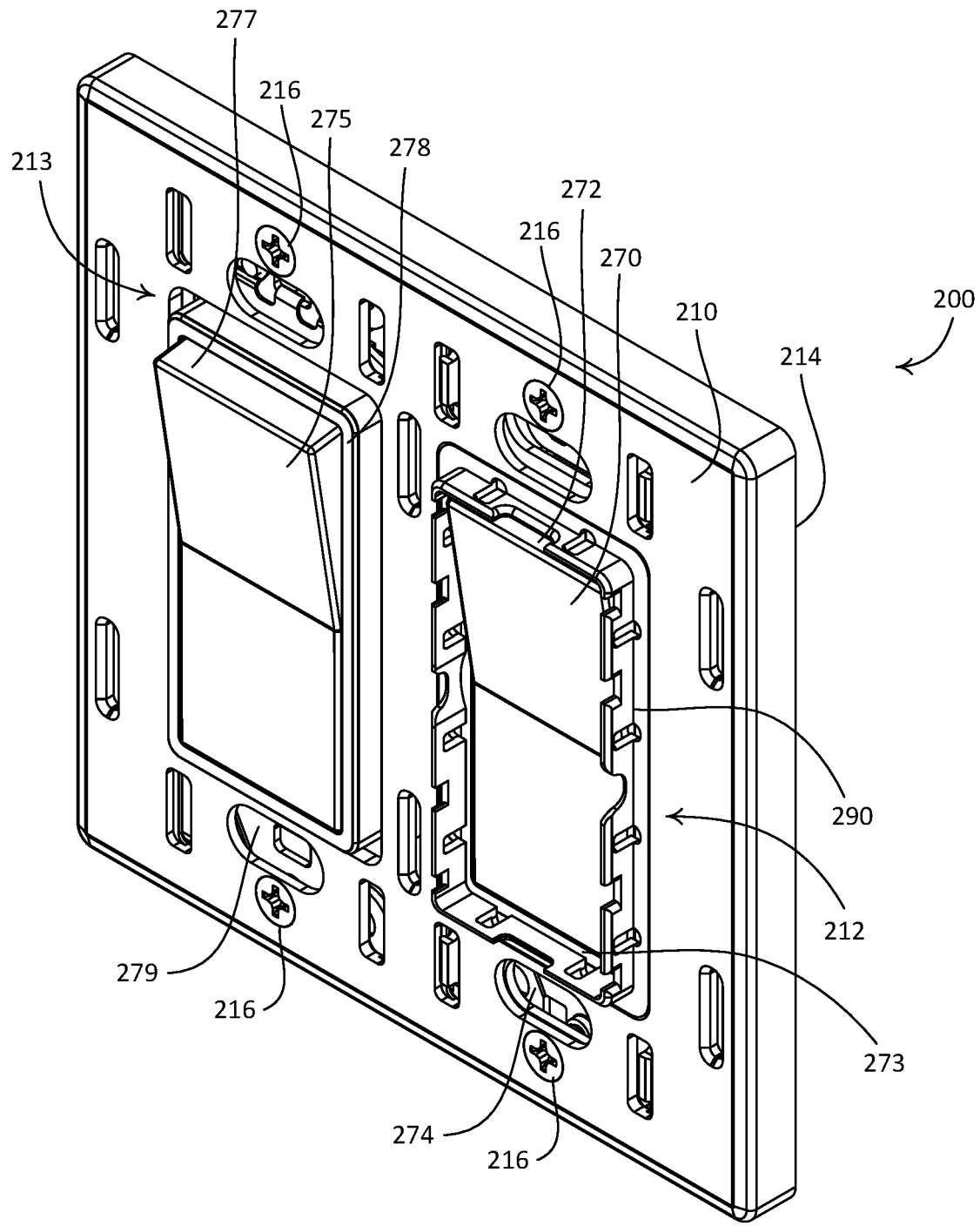
FIG. 9 is a perspective view of the example mounting frame illustrated in FIG. 8A next to a standard paddle switch in a double-gang wallbox.

FIG. 9 depicts an example mounting frame 290 installed in a multi-gang wallbox. For example, a remote control device (e.g., such as the remote control device 100) may be configured to be installed over a first mechanical switch 270 in a multi-gang wallbox next to a second electrical device (e.g., a second mechanical switch 275). The multi-gang wallbox may be a double gang wallbox, as shown. The remote control device may be installed next to one or more other remote control devices and/or one or more other mechanical switches in a multi-gang wallbox.

It should be appreciated that the second electrical device in the multi-gang wallbox 250 is not limited to a second mechanical switch 275. For example, the second electrical device could alternatively be an electrical outlet, or another type of electrical device that is configured to be installed for use with a faceplate having a decorator style opening.

The remote control device may include an adapter plate 210, the mounting frame 290, a control unit (not shown), and a faceplate (not shown). The control unit may be constructed identically to the control unit 130 of the remote control device. The adapter plate 210, the mounting frame 290, and the faceplate may be constructed similarly to the adapter plate 110, the mounting frame 190, and the faceplate 160, with the below-described differences in configuration for use in a double-gang implementation.

As shown, the adapter plate 210 may define first and second openings 212, 213 that extend therethrough. The first and second openings 212, 213 may be configured to receive respective portions of the first and second mechanical switches 270, 275 that may include, for example, the actuators 272, 277 and corresponding bezels 273, 278 that surround respective perimeters of the actuators 272, 277. The adapter plate 210 may define a rear edge 214 that is configured to abut a surface of a structure to which the first and second mechanical switches 270, 275 are installed, such as a wallboard surface that surrounds a double-gang wallbox in which the first and second mechanical switches 270, 275 are installed. The mounting frame 290 may be installed in the first opening 212 and/or the second opening 213 of the adapter plate 210. For example, a mounting frame 290 may be installed in the first opening 212, as illustrated in FIG. 9.

Before installation of the remote control device, an original installed position of the second mechanical switch 275 (e.g., with the yoke 279 screwed to the double-gang wallbox) may cause the actuator 277 and the bezel 278 of the second mechanical switch 275 to be recessed relative to a front surface of the faceplate. However, during attachment of the adapter plate 210 to the yoke 279 of the second mechanical switch 270, screws (not shown) that secure the yoke 279 to the double-gang wallbox may be loosened. With the screws that secure the yoke 279 loosened, the screws 216 that correspond to the second opening 213 may be tightened, which may draw the yoke 279 of the second mechanical switch 275 outward relative to the double-gang wallbox and toward a front surface of the adapter plate 210. The process of loosening the screws that secure the yoke 279, followed by tightening the screws 216, may be repeated until the yoke 279 of the second mechanical switch 275 is moved outward sufficiently such that the bezel 278 is substantially flush with, or protrudes proud of, the front surface of the faceplate when the faceplate is attached to the adapter plate 210. In this regard, the adapter plate 210 may be configured to enable adjustment of the yokes 274, 279 of the first and second mechanical switches 270, 275, respectively, toward and away from the double-gang wallbox, and toward or away from the front surface of the faceplate. An example of a similar procedure for mounting a remote control device in a multi-gang wallbox is disclosed in commonly-assigned U.S. Patent Application Publication No. 2017/0278652, published Sep. 28, 2017, entitled RETROFIT REMOTE CONTROL DEVICES, the entire disclosure of which is hereby incorporated by reference.

Figure 10:
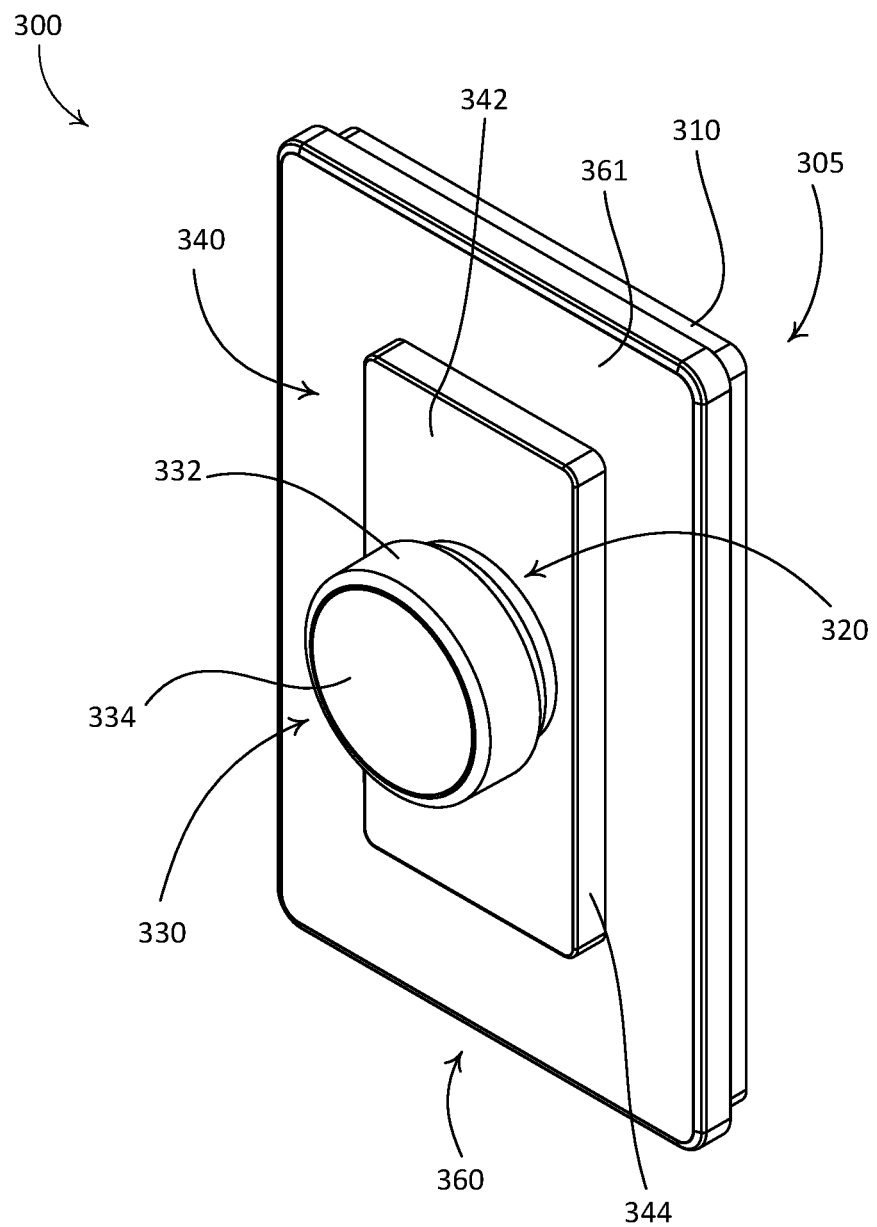
FIG. 10 is a perspective view of an example remote control device having an alternate control unit configuration.
Figure 11:
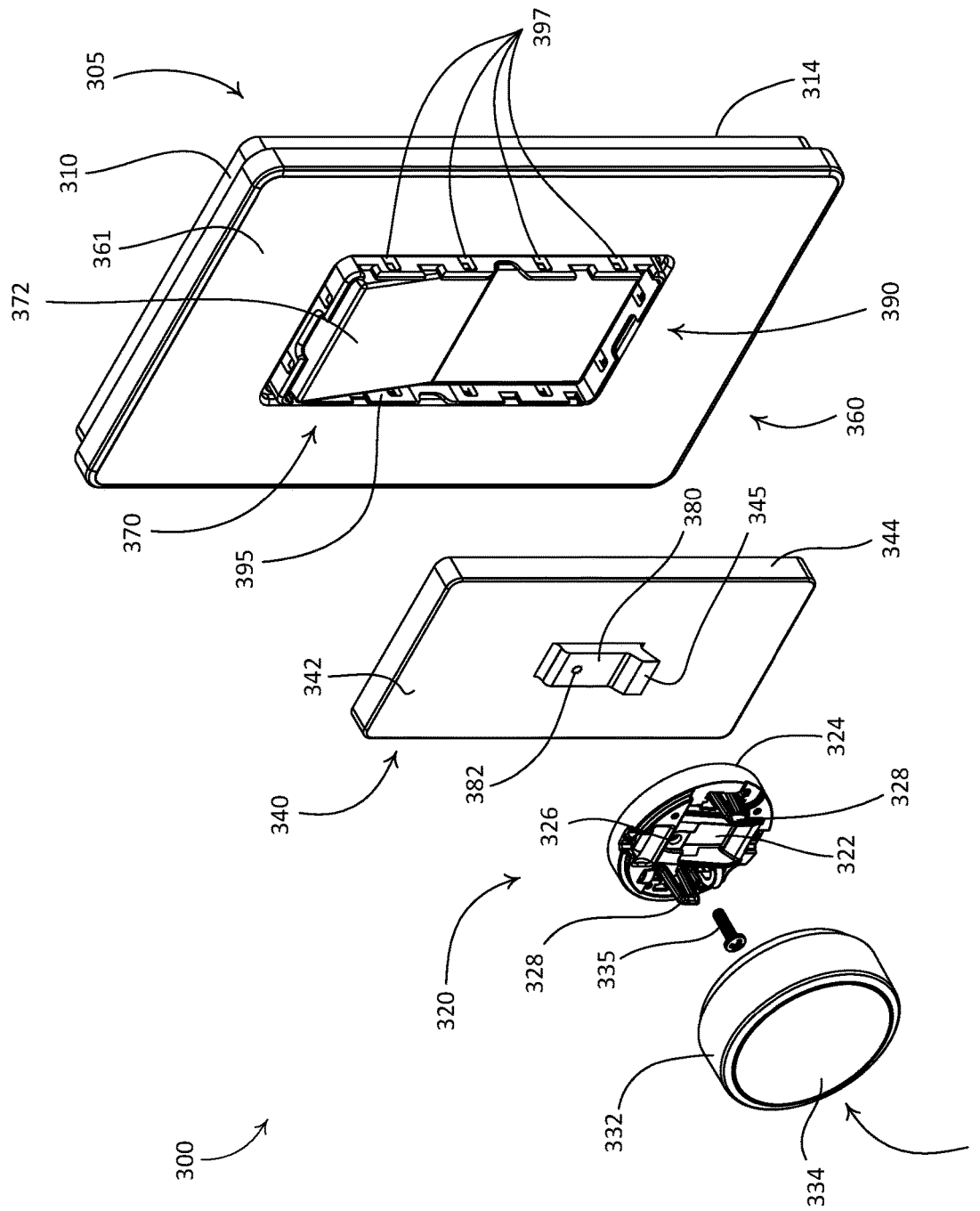
FIG. 11 is a partially exploded view of the example remote control device shown in FIG. with an example base component mounted to a paddle actuator of a light switch.

FIGS. 10 and 11 depict an example of a remote control device 300 that may be installed in a load control system, such as a lighting control system. The load control system may include the mechanical switch 370 (e.g., such as the mechanical switch 170 shown in FIGS. 4, 6, and 7) that may be in place prior to installation of the remote control device 300, for example pre-existing in the load control system. As shown, the mechanical switch 370 may be a standard decorator paddle switch, as described herein. The load control system may further include one or more electrical loads, such as lighting loads. The mechanical switch 370 may be coupled in series electrical connection between an alternating current (AC) power source and the one or more electrical loads.

The load control system may further include a load control device (not shown) that is electrically connected to the one or more electrical loads (e.g., lighting loads). The load control device may include a load control circuit for controlling the intensity of one or more of the lighting loads between a low-end intensity (e.g., approximately 1%) and a high-end intensity (e.g., approximately 100%), and may include a wireless communication circuit. In an example implementation, the load control device may be a standalone dimmer switch that is electrically connected to the one or more lighting loads. In another example implementation, each of the one or more electrical loads may be a controllable light source (e.g., a screw-in light-emitting diode (LED) lamp) that each may include a respective integrated load control circuit and wireless communication circuit (e.g., the lighting load includes a corresponding load control device that is configured for wireless communication). It should be appreciated that the load control system is not limited to the example load control devices described herein.

The remote control device 300 may include a control unit 330 (e.g., a control module), a base 320, and a faceplate assembly 305 (e.g., such as the faceplate assembly 105). The base 320 may operate as a mount for the control unit 330, for example, to mount the control unit 330 to the faceplate assembly 305. The base 320 may alternatively be referred to as a base portion or a mounting assembly. The control unit 330 and the base 320 may be configured such that the control unit 330 may be removably attached to the base 320. The control unit 330 may alternatively be referred to as a control module. It should be appreciated that other control units described herein may similarly be alternatively referred to as control modules.

The control unit 330 may comprise a user interface including a rotating portion 332 and an actuation portion 334. The rotating portion 332 may be rotatable with respect to the base 320 and/or the faceplate assembly 305 (e.g., faceplate 360). For example, as shown, the control unit 330 includes an annular rotating portion 332 that is configured to rotate about the base 320. The remote control device 300 may be configured such that the control unit 330 and the base 320 are removably attachable to one another. FIG. 11 depicts the remote control device 300 with the control unit 330 detached from the base 320. When the control unit 330 is attached to the base 320 (e.g., as shown in FIG. 25), the rotating portion 332 may be rotatable in opposed directions about the base 320, for example in the clockwise or counterclockwise directions. The base 320 may be configured to be mounted over a light switch such that the application of rotational movement to the rotating portion 332 does not actuate the light switch.

The actuation portion 334 may be operated separately from or in concert with the rotating portion 332. As shown, the actuation portion 334 may include a circular surface within an opening defined by the rotating portion 332. In an example implementation, the actuation portion 334 may be configured to move inward toward the light switch to actuate a mechanical switch (not shown) inside the control unit 330, for instance as described herein. The actuation portion 334 may be configured to return to an idle or rest position after being actuated. In this regard, the actuation portion 334 may be configured to operate as a toggle control of the control unit 330.

The remote control device 300 may be configured to transmit one or more wireless communication signals (e.g., RF signals) to one or more control devices. The remote control device 500 may include a wireless communication circuit, e.g., an RF transceiver or transmitter (not shown), via which one or more wireless communication signals may be sent and/or received. The control unit 330 may be configured to transmit digital messages (e.g., including commands) in response to one or more actuations applied to the control unit 330, such as operation of the rotating portion 332 and/or the actuation portion 334. The digital messages may be transmitted to one or more devices associated with the remote control device 300, such as the controllable light source. For example, the control unit 330 may be configured to transmit a command via one or more RF signals to raise the intensity of the controllable light source in response to a clockwise rotation of the rotating portion 332 and a command to lower the intensity of the controllable light source in response to a counterclockwise rotation of the rotating portion 332. The control unit 330 may be configured to transmit a command to toggle the controllable light source (e.g., from off to on or vice versa) in response to an actuation of the actuation portion 334. In addition, the control unit 330 may be configured to transmit a command to turn the controllable light source on in response to an actuation of the actuation portion 334 (e.g., if the control unit 330 knows that the controllable light source is presently off). The control unit 330 may be configured to transmit a command to turn the controllable light source off in response to an actuation of the actuation portion 334 (e.g., if the control unit 330 knows that the controllable light source is presently on).

As described herein, the remote control device 300 may comprise a battery (not shown) for powering at least the remote control device 300. The remote control device 300 may be configured to enable releasable attachment of the control unit 330 to the base 320 (e.g., to allow for replacement of the battery). For example, the control unit 330 may comprise two tabs (not shown) configured to snap onto respective attachment clips 328 on the base 320. The control unit 330 may be installed on the base 320 by pushing the control unit towards the base 320 until the tabs of the control unit 330 engage the attachment clips 328. The control unit 330 may be released from the base 320 by pulling the control unit 330 away from the base 320. In addition, the base 320 may include a release mechanism that may be actuated to release the control unit 330 from the base 320. For example, the base 320 may include a sliding release tab that may be actuated to release the control unit 330 from the base 320.

The remote control device 300 may be configured to be installed over a paddle actuator 372 (e.g., instead of a toggle actuator). For example, the remote control device 300 may include a cover portion 340 (e.g., a mounting adapter) and a mounting frame 390. The cover portion 340 may be configured to cover the actuator of the mechanical switch and receive the base 320. For example, the base 320 may be attached (e.g., releasably attached) to the cover portion 340. The base 320 may define an opening 322 for allowing for attachment of the base 320 to the cover portion 340 (e.g., as will be described in greater detail below). The cover portion 340 may be configured to releasably retain the base 320. The cover portion 340 may define a front surface 342 and a rear surface 344. The cover portion 340 may include a mounting tab 345 that extends from the front surface 342. The mounting tab 345 may be configured to be received in the opening 322 of the base 320. The mounting tab 345 may be configured to prevent rotation of the base 320 when the base 320 is attached to the cover portion 340 and the rotating portion 332 is rotated. The cover portion 340 may include one or more snaps (e.g., similar to snaps 140 shown in FIG. 5) that extend from the rear surface 534. The one or more snaps may be configured to secure the cover portion 340 to the faceplate assembly 305.

The remote control device 300 may include a fastener 335. The fastener 335 may be configured to secure the remote control device 300 (e.g., the base 320) to the cover portion 340. For example, the fastener 335 may be configured to secure the base 320 to a platform 380 that extends from the front surface 342 of the cover portion 340. The mounting tab 345 may extend from the platform 380. The platform 380 may define an aperture 382. The aperture 382 may receive the fastener 335, for example, to secure the remote control device 300 (e.g., the base 320) to the cover portion 340. The aperture 382 may be threaded. The base 320 may include a through-hole 326 that is configured to receive the fastener 335. A rear surface 324 of the base 320 may abut the front surface 342 of the cover portion 340 when the remote control device 300 is secured to the cover portion 340.

The faceplate assembly 305 may include an adapter plate 310, a mounting frame 390, and a faceplate 360. Prior to installation of the remote control device 300, a pre-existing faceplate (not shown) may be removed from the mechanical switch 370. The adapter plate 310 may be made of any suitable material, such as plastic. The adapter plate 310 may be configured to be attached to a yoke (e.g., such as yoke 174 shown in FIG. 6) of the mechanical switch 370. The faceplate 360 may be configured to be attached to the adapter plate 310. The adapter plate 310 may define a rear edge 314 that is configured to abut a surface of a structure to which the mechanical switch 370 is installed, such as a wallboard surface that surrounds a wallbox in which the mechanical switch 370 is installed. The adapter plate 310 may be configured such that the faceplate 360 is spaced from the structure and appears to be floating off the structure.

Figure 7:
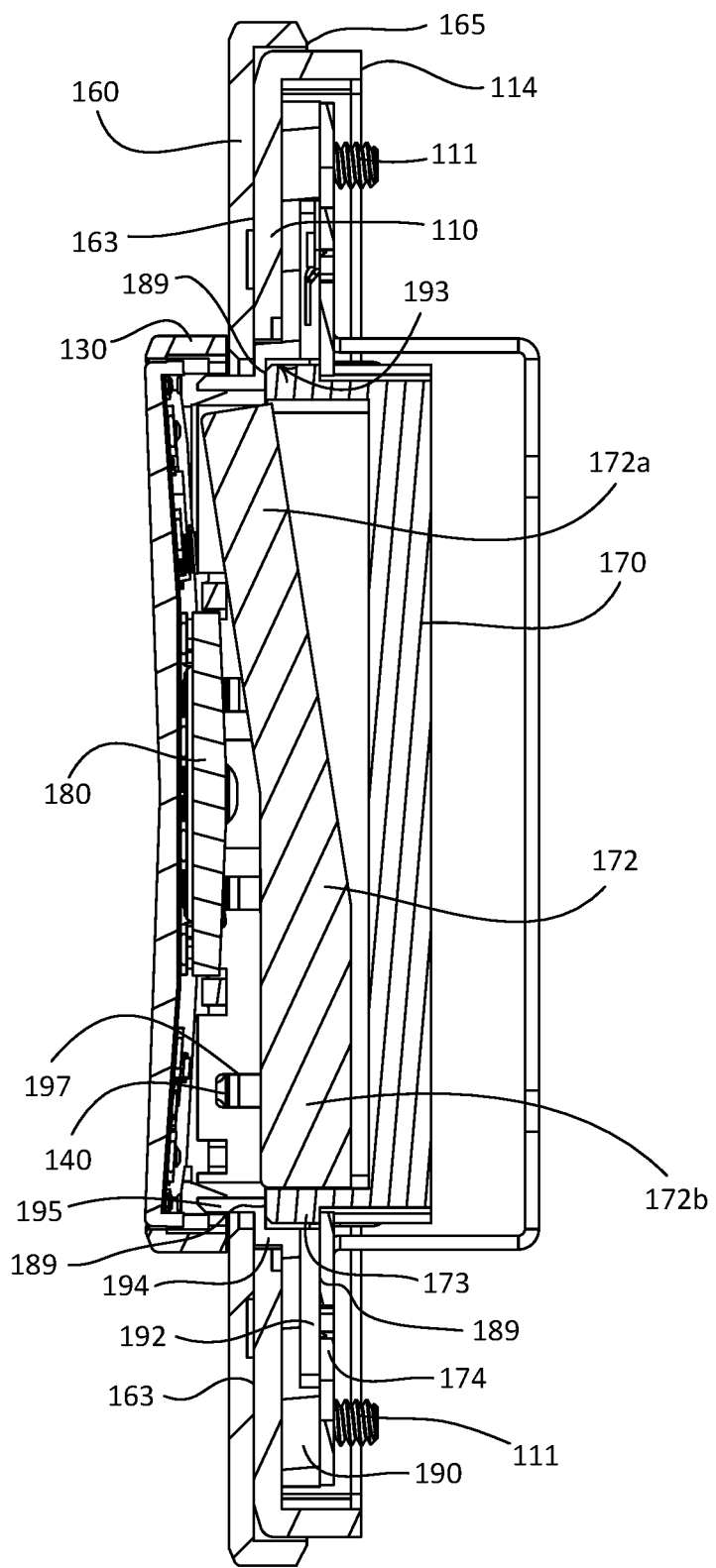
FIG. 7 is a side section view of the example remote control device illustrated in FIG. 1.

The faceplate 360 may define a front surface 361 and an opposed rear surface (e.g., such as rear surface 163 shown in FIG. 7). The front surface 361 may alternatively be referred to as an outer surface of the faceplate 360, and the rear surface may alternatively be referred to as an inner surface of the faceplate 360. The faceplate 360 may define an opening (e.g., such as opening 162 shown in FIG. 6) therethrough that is configured to receive a portion of the mounting frame 390. The faceplate 360 may define one or more snaps (e.g., resilient snap fit connectors) that extend from the rear surface and are configured to engage with the one or more holes of the adapter plate 310, to releasably attach the faceplate 360 to the adapter plate 310. The faceplate 360 may be made of any suitable material, such as plastic. The faceplate 360 may include an indicia (not shown), such as, for example, a manufacturer name or icon. The indicia may indicate a proper orientation of the faceplate 360. The rear surface of the faceplate may include mounting instructions for the faceplate 360 and/or the remote control 300.

The mounting frame 390 may define a plate (e.g., such as the plate 192 shown in FIGS. 6 and 8A-8D), an opening (e.g., such as the opening 191 shown in FIGS. 6 and 8A-8B), and a mounting ring 395. The mounting ring 395 may extend from the plate, for example, such that the mounting ring 395 surrounds the opening. A front surface of the bezel of the mechanical switch 370 may abut the mounting frame 390 when the remote control device 300 is installed on the mechanical switch 370.

The mounting frame 390 may be configured to enable removable attachment of the cover portion 340 to the mounting frame 390. For example, the mounting frame 390 may define one or more attachment members that are configured to engage with complementary features of the cover portion 340. As shown, the mounting ring 395 may define one or more apertures 397 that are configured to engage with complementary features of the cover portion 340. For example, each of the one or more apertures 397 may be configured to receive a respective snap (e.g., snap fit connector) of the cover portion 340. The mounting ring 395 may extend through the opening in the faceplate 360. The mounting ring 395 may extend from the bezel of the mechanical switch 370 through the opening in the faceplate 360 such that the cover portion 340 can be secured to the mounting frame 390. For example, the cover portion 340 may mount to the mounting frame 390 proximate to the front surface 361 of the faceplate 360.

It should be appreciated that the example remote control devices 100, 300 illustrated and described herein may each provide a simple retrofit solution for an existing switched control system and may ease the installation of a load control system or enhance an existing load control system installation. A load control system that integrates one or more remote control devices 100, 300 may provide energy savings and/or advanced control features, for example without requiring any electrical re-wiring and/or without requiring the replacement of any existing mechanical switches.

It should further be appreciated that load control systems into which the example remote control devices 100, 300 may be integrated are not limited to the example load control devices and/or electrical loads described above. For example, load control systems into which the example remote control devices 100, 300 may be integrated may include one or more of: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; hydraulic valves for use in one or more radiators of a radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and the like.

The invention claimed is:

1. A remote control device that is configured for use in a load control system comprising an electrical load, the remote control device comprising:
a mounting frame that defines a plate, a mounting-frame opening therethrough, and a mounting ring extending from the plate and surrounding the mounting-frame opening, the mounting frame configured to be mounted over a mechanical switch that controls whether power is delivered to the electrical load such that a portion of the mechanical switch extends through the mounting-frame opening of the mounting frame;
a faceplate defining a faceplate opening and configured to be mounted over the mounting frame such that the mounting ring of the mounting frame is received through the faceplate opening of the faceplate; and
a control unit configured to be attached to the mounting ring, the control unit comprising:
  a user interface comprising an actuation portion configured to pivot in response to actuation of an upper portion of the actuation portion and configured to pivot in response to actuation of a lower portion of the actuation portion;
  a wireless communication circuit; and
  a battery for powering the wireless communication circuit, the battery located at a center of the remote control device such that the battery does not interfere with the actuator of the mechanical switch when the actuator is in either of two orientations,
wherein the control unit is configured to, in response to actuation of the upper portion or the lower portion of the actuation portion of the user interface, cause the wireless communication circuit to transmit a wireless signal for controlling the electrical load,
wherein the mounting frame is configured to abut a bezel of the mechanical switch such that the faceplate is spaced away from the bezel of the mechanical switch to enable the mounting ring to extend through the faceplate opening of the faceplate.

2. The remote control device of claim 1, further comprising an adapter plate configured to be attached to a yoke of the mechanical switch.

3. The remote control device of claim 2, wherein when the mechanical switch is mounted in a wallbox, the mounting frame is attached to the adapter plate and the adapter plate is attached to the faceplate.

4. The remote control device of claim 2, wherein when the control unit is attached to the mounting ring and the faceplate is attached to the adapter plate, a rear surface of the faceplate is spaced from a rear surface of the adapter plate that abuts a structural surface.

5. The remote control device of claim 2, wherein when the control unit is attached to the adapter plate, the faceplate is spaced from a surface of a structure to which the mechanical switch is mounted.

6. The remote control device of claim 1, wherein the control unit is configured to translate a user input received via the user interface into a control signal that controls the load control device.

7. The remote control device of claim 1, wherein the two orientations comprise a first orientation where an upper portion of the actuator protrudes from the bezel of the mechanical switch and a second orientation where a lower portion of the actuator protrudes from the bezel of the mechanical switch.

8. The remote control device of claim 7, wherein the control unit is configured to be attached to the mounting ring when the actuator of the mechanical switch is in the first orientation or the second orientation.

9. The remote control device of claim 1, wherein the control unit is configured to be attached to the mounting ring when the actuator of the mechanical switch is in either of the two orientations.

10. The remote control device of claim 1, wherein the control unit is configured to be removed from the mounting ring to enable replacement of the battery.

11. The remote control device of claim 1, wherein the control unit is configured to be removably attached to the mounting ring.

12. The remote control device of claim 1, wherein the user interface is configured as a touch sensitive surface.

13. The remote control device of claim 1, wherein the mounting frame comprises a lip surrounding the mounting-frame opening, the lip extending from the plate.

14. The remote control device of claim 13, wherein the mounting ring extends from the lip.

15. The remote control device of claim 13, wherein the lip is configured to abut the rear surface of the faceplate such that the faceplate is spaced away from the bezel of the mechanical switch.

16. The remote control device of claim 1, wherein the control unit defines a recess that is configured to receive a portion of the actuator of the mechanical switch.

17. The remote control device of claim 1, wherein the control unit is configured to pivot about a central axis.

18. The remote control device of claim 17, wherein the central axis is proximate to the center of the remote control device.

19. The remote control device of claim 1, wherein the control unit is configured to turn the electrical load on in response to an actuation of the upper portion of the actuation portion and turn the electrical load off in response to an actuation of the lower portion of the actuation portion.

20. The remote control device of claim 1, wherein the mounting ring comprises a plurality of apertures configured to receive respective snaps of the control unit to removably secure the control unit to the mounting ring.

* * * * *